(12) United States Patent
Edling et al.

(10) Patent No.: US 9,973,635 B1
(45) Date of Patent: May 15, 2018

(54) SYSTEM AND METHOD FOR PROCESSING OF A SERVICE SUBSCRIPTION USING A TELECOMMUNICATIONS OPERATOR

(71) Applicant: SPOTIFY AB, Stockholm (SE)

(72) Inventors: Göran Edling, Stockholm (SE); Peter Simon, Stockholm (SE); Felix Bouleau, Stockholm (SE); Chris Bevington, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days. days.

(21) Appl. No.: 15/354,810

(22) Filed: Nov. 17, 2016

(51) Int. Cl.
*H04M 3/42* (2006.01)
*H04M 15/00* (2006.01)
*H04W 8/18* (2009.01)
*G06Q 30/02* (2012.01)
*H04W 4/24* (2018.01)

(52) U.S. Cl.
CPC ...... *H04M 15/723* (2013.01); *G06Q 30/0207* (2013.01); *H04M 15/46* (2013.01); *H04M 15/61* (2013.01); *H04W 8/18* (2013.01); *H04M 15/51* (2013.01); *H04M 15/755* (2013.01); *H04W 4/24* (2013.01)

(58) Field of Classification Search
CPC ........... H04W 4/22; H04W 4/14; H04W 4/12; H04W 4/025; H04W 12/08
USPC ......... 455/406, 405, 412.2, 404.2, 418, 466, 455/407
See application file for complete search history.

(56) References Cited

U.S. PATENT DOCUMENTS

| | | | |
|---|---|---|---|
| 7,827,057 B1 * | 11/2010 | Walker | G06Q 10/101 705/14.1 |
| 8,433,617 B2 * | 4/2013 | Goad | G06F 17/3087 705/26.41 |
| 9,317,849 B2 * | 4/2016 | Pitroda | |

(Continued)

FOREIGN PATENT DOCUMENTS

| EP | 3076353 | 10/2016 |
|---|---|---|
| EP | 3076353 A1 | 10/2016 |

OTHER PUBLICATIONS

Google: "TelephonyManager Android Developers", Jan. 9, 2017. XP055333153, https://developer.android.com/reference/android/teelphony/TelephonyManager/html; pp. 8-9, 2 pages.

(Continued)

*Primary Examiner* — Joseph Arevalo
(74) *Attorney, Agent, or Firm* — Tucker Ellis LLP (57) ABSTRACT

A method performed in a radio device comprising a client of a service. In accordance with an embodiment, the method comprises sending, from the radio device to the service provider, a request requesting information about whether a telecommunications operator (telco), which the radio device is connected via, provides any offer for a subscription to the service; receiving a message comprising an indication that the telco provides such an offer and an address for contacting the telco regarding said offer; sending a message by means of the received address of the telco, regarding available offers; receiving a confirmation message comprising information about an available offer for a subscription to the service; receiving an indication that the available offer is accepted; and, to the service provider, sending a message indicating that the available offer has been accepted and should be activated.

7 Claims, 4 Drawing Sheets

(56) References Cited

U.S. PATENT DOCUMENTS

| | | | |
|---|---|---|---|
| 9,330,389 B2* | 5/2016 | Pitroda | |
| 2008/0098433 A1* | 4/2008 | Hardacker | H04N 7/163 |
| | | | 725/52 |
| 2011/0137745 A1* | 6/2011 | Goad | G06F 17/3087 |
| | | | 705/26.9 |
| 2011/0137776 A1* | 6/2011 | Goad | G06Q 20/102 |
| | | | 705/34 |
| 2011/0137818 A1* | 6/2011 | Goad | G06Q 30/02 |
| | | | 705/347 |
| 2011/0295722 A1* | 12/2011 | Reisman | G06Q 30/0201 |
| | | | 705/27.1 |
| 2016/0042416 A1* | 2/2016 | Slowakowski | G06Q 10/06315 |
| | | | 705/7.29 |
| 2016/0292771 A1 | 10/2016 | Afzelius | |

OTHER PUBLICATIONS

Extended European Search Report for Application No. 16199306.8 dated Jan. 18, 2017, 10 pages.

Office Action for European Application No. 16 199 306.8-1958 dated May 15, 2017, 4 pages.

Summons to Oral Proceedings for European Application No. 16 199 306.8-1958 dated Oct. 5, 2017, 8 pages.

Google: "TelephonyManager Android Developers", Jan. 9, 2017. XP055333153, https://developer.android.com/reference/android/teelphony/TelephonyManager/html; 47 pages.

\* cited by examiner

SYSTEM AND METHOD FOR PROCESSING OF A SERVICE SUBSCRIPTION USING A TELECOMMUNICATIONS OPERATOR

TECHNICAL FIELD

The present disclosure relates to methods and devices for use with a radio or other device having a client to a service provided by a service provider, for processing a service subscription using a telecommunications operator (telco).

BACKGROUND

A telco can cooperate with a service provider to offer a free subscription to the service provided by the service provider, an upgraded subscription with improved features, or the like, e.g., as part of a campaign to attract new customers or satisfy current customers of the telco.

This implies that the telco customer has to create an account with the service provider (if not already having one) and then login to the telco customer portal and enter the username of the service account. The telco can then contact the service provider and activate the offer for the given username.

This is a well functioning way of providing the offer to a telco customer, who is also a user of the service, but there is a risk that some customers find the procedure too complicated or do not manage to perform the manual steps needed correctly for it to work. Also, if may, for security and integrity reasons, not be desirable that the telco is provided with the username of the service account.

SUMMARY

It is an objective of the present disclosure to provide an improved way of providing a service subscription offer to a telco customer which may be regarded as more simple and/or intuitive by a user.

According to an aspect of the present disclosure, there is provided a method performed in a radio device comprising a client of a service. The method comprises: determining which telco the radio device is connected via; to a service provider providing the service, initiating sending of a request requesting information about whether the telco provides any offer for a subscription to the service; from the service provider, in response to the sent request, receiving a message comprising an indication that the telco provides such an offer and an address for contacting the telco regarding said offer; via a user interface of the radio device, receiving an indication that a user of the radio device requests access to the service via the client; via the user interface, in response to the received indication that the user requests access to the service, requesting input from the user about whether said user wants to check whether an offer for a subscription to the service is available; in response to the input having been requested, via the user interface, receiving an indication that the user wants to check whether an offer for a subscription to the service is available; in response to the received indication that the user wants to check whether an offer is available, initiating sending a message by means of the received address of the telco via the connection provided by said telco; receiving a confirmation message comprising information about an available offer for a subscription to the service; via the user interface, presenting the available offer; via the user interface, receiving an indication that the available offer is accepted; and to the service provider, initiating sending a message indicating that the available offer has been accepted and should be activated.

According to another aspect of the present disclosure, there is provided a computer program product comprising computer-executable components for causing a radio device to perform an embodiment of a method of the present disclosure when the computer-executable components are run on processing circuitry comprised in the radio device.

According to another aspect of the present disclosure, there is provided a radio device configured to perform the radio device method aspect of the present disclosure. The radio device comprises processing circuitry, and storage storing instructions executable by said processing circuitry whereby said radio device is operative to: determine which telco the radio device is connected via; to a service provider providing the service, initiate sending of a request requesting information about whether the telco provides any offer for a subscription to the service; from the service provider, in response to the sent request, receive a message comprising an indication that the telco provides such an offer and an address for contacting the telco regarding said offer; via a user interface of the radio device, receive an indication that a user of the radio device requests access to the service via the client; via the user interface, in response to the received indication that the user requests access to the service, request input from the user about whether said user wants to check whether an offer for a subscription to the service is available; in response to the input having been requested, via the user interface, receive an indication that the user wants to check whether an offer for a subscription to the service is available; in response to the received indication that the user wants to check whether an offer is available, initiate sending a message by means of the received address of the telco via the connection provided by said telco; receive a confirmation message comprising information about an available offer for a subscription to the service; via the user interface, present the available offer; via the user interface, receive an indication that the available offer is accepted; and to the service provider, initiate sending a message indicating that the available offer has been accepted and should be activated.

According to another aspect of the present disclosure, there is provided a method performed in a server arrangement of a service provider. The method comprises: from a radio device, receiving a request requesting information about whether a telco provides any offer for a subscription to the service provided by the service provider; in response to the received request, sending a message comprising an indication that the telco provides such an offer and an address for contacting the telco regarding said offer; and from the radio device, receiving a message indicating that the offer has been accepted and should be activated.

According to another aspect of the present disclosure, there is provided a computer program product comprising computer-executable components for causing a server arrangement to perform an embodiment of a method of the present disclosure when the computer-executable components are run on processing circuitry comprised in the server arrangement.

According to another aspect of the present disclosure, there is provided a server arrangement configured to perform an embodiment of the server arrangement method aspect of the present disclosure. The server arrangement comprises processing circuitry, and storage storing instructions executable by said processing circuitry whereby said server arrangement is operative to: from a radio device, receive a request requesting information about whether a telco provides any offer for a subscription to the service provided by the service provider; in response to the received request, send a message comprising an indication that the telco provides such an offer and an address for contacting the telco regarding said offer; and from the radio device, receive a message indicating that the offer has been accepted and should be activated.

By means of embodiments of the present disclosure, a service subscription offer may be offered to the user such that said user does not have to actively log in to its telco account to activate the offer for a subscription of a service provided by a service provider (which is not the telco). By the address to the telco provided by the service provider, the client can contact the telco directly to receive an available offer to the user. The address is known by the service provider, e.g., as a result of an agreement between the telco and the service provider regarding the offer.

Typically, a telco will use an identifier (herein called a telco user ID) with which it identifies the user. This telco user ID may e.g., be the telephone number of the user's radio device which is provided with connection by the telco, a customer number and/or other user name. Similarly, the service provider will use an identifier (herein called a service user ID) with which it identifies the user. This service user ID may e.g., be a customer number and/or other user name. For security and privacy reasons, it may not be desirable to spread such IDs, why the telco should preferably not be informed of the service user ID, and the service provider should preferably not be informed of the telco user ID. Since the client communicates with the telco via the connection provided by the telco, the telco may identify the radio device of the user, without a need for the client or the service provider to be informed of the telco user ID. Since the user communicates directly with the service provider (via the client), there may be no need to involve a service user ID in communication with the telco (the service provider already knows which user it is). In some embodiments, a temporary service user ID may be used to more easily keep track of the communication session between the service provider or client and the telco.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

That the sending of a message, request, indication or the like, is "initiated" implies herein that the sending is initiated by an entity but not necessarily sent by it. For instance, the service client in the radio device may initiate the sending, but the actual sending may be performed by the radio interface of the radio device.

Figure 1:
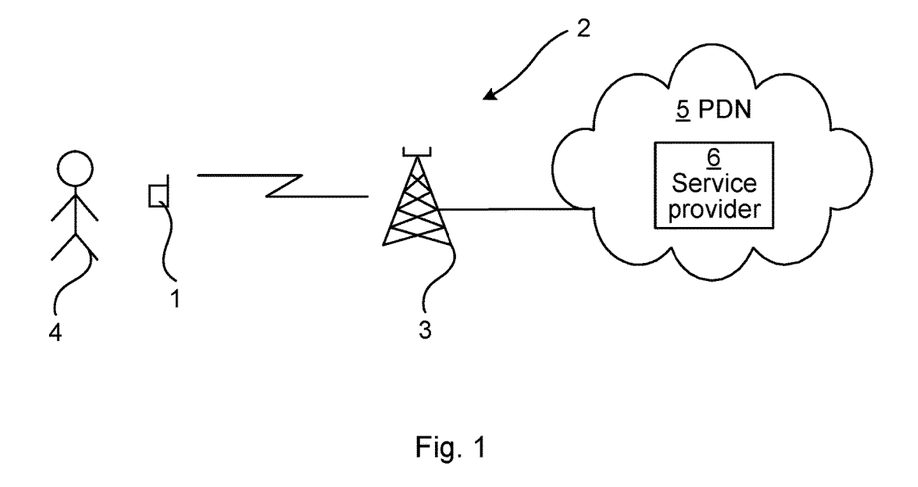
FIG. 1 is a schematic illustration of an embodiment of a communication system in accordance with the present invention.

FIG. 1 illustrates an embodiment of a communication system in which a user 4 (typically human) has a radio device 1 which is able to communicate with a service provider 6 via a connection to a Packet Data Network (PDN) 5, e.g., the Internet, provided by means of a Radio Access Network (RAN) 3 of a telco 2. The RAN may e.g., be a cellular network such as in accordance with a Third Generation Partnership Program (3GPP) communication standard.

The radio device 1 may be any device or user equipment (UE), mobile or stationary, enabled to communicate over a radio channel in a communication network, for instance but not limited to e.g., mobile phone, smartphone, modem, vehicles (e.g., a car), household appliances, media players, or any type of consumer electronic, for instance but not limited to television, radio, lighting arrangements, tablet computer, laptop, or personal computer (PC). In accordance with the present disclosure, the radio device comprises a client for a service provided by the service provider 6.

The service provided by the service provider, and provided to the user 4 by means of the client in the radio device 1, may be any service, e.g., a media service for downloading or streaming media files such as audio (e.g., music) and/or video files and for playing (outputting) said media files to the user, e.g., via a (loud) speaker, headphone interface (e.g., jack) or radio (e.g., Bluetooth) interface of the radio device.

Figure 2:
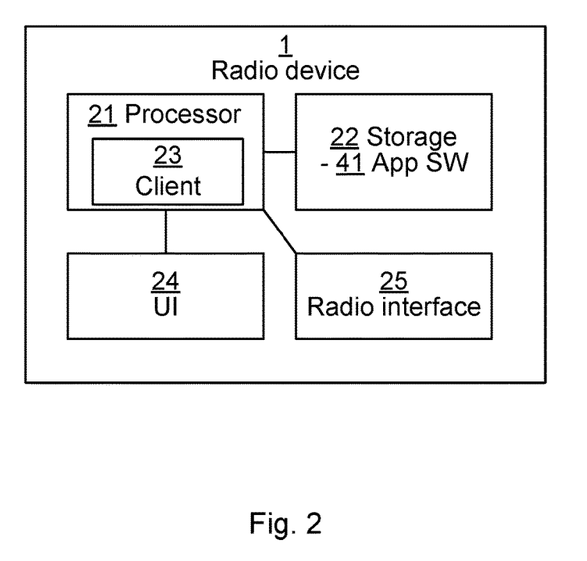
FIG. 2 is a schematic block diagram of an embodiment of a radio device, in accordance with the present invention.

FIG. 2 illustrates an embodiment of a radio device 1 of the present disclosure. The radio device 1 comprises processing circuitry 21 e.g., a central processing unit (CPU). The processing circuitry 21 may comprise one or a plurality of processing units in the form of microprocessor(s). However, other suitable devices with computing capabilities could be comprised in the processing circuitry 21, e.g., an application specific integrated circuit (ASIC), a field programmable gate array (FPGA) or a complex programmable logic device (CPLD). The processing circuitry 21 is configured to run one or several computer program(s) or software (SW) 41 (see also FIG. 4) stored in a storage 22 of one or several storage unit(s) e.g., a memory. The storage unit is regarded as a computer readable means 43 (see FIG. 4) as discussed herein and may e.g., be in the form of a Random Access Memory (RAM), a Flash memory or other solid state memory, or a hard disk, or be a combination thereof. The processing circuitry 21 may also be configured to store data in the storage 22, as needed. In accordance with the present disclosure, the storage 22 may store application (app) SW 41 which, when run on the processing circuitry 21, forms a software application (an app), here a client 23 to the service provider 6. The radio device 1 also comprises a user interface (UI) 24, e.g., comprising a Graphical User Interface (GUI) such as a touchscreen, for presenting information to the user and for allowing input of indications from the user. Further, the radio device comprises a radio interface 25 for communication over the RAN 3 and thus allowing the radio device access to the PDN/Internet 5.

Figure 3:
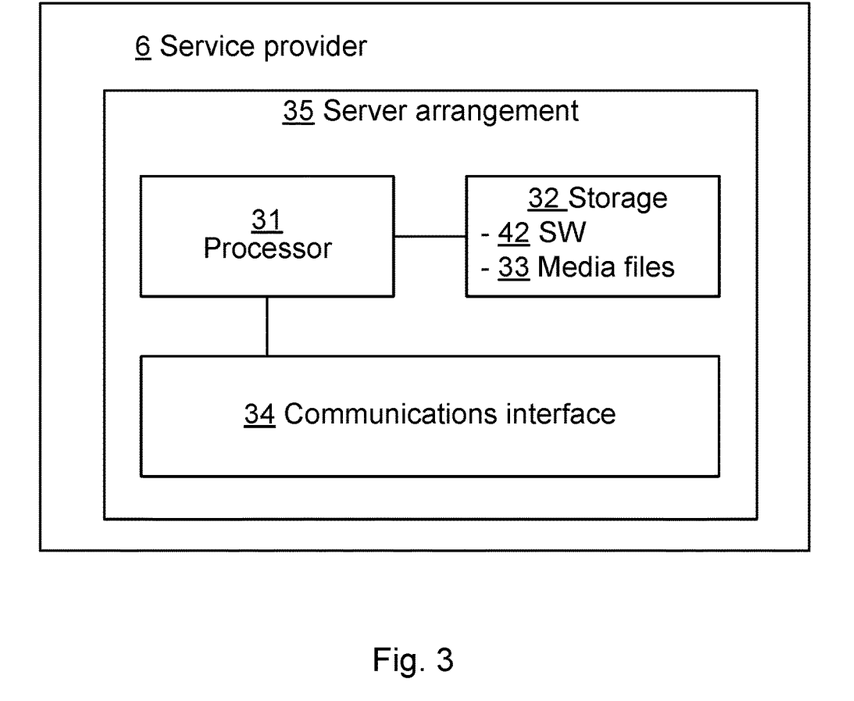
FIG. 3 is a schematic block diagram of an embodiment of a service provider, in accordance with the present invention.

FIG. 3 illustrates an embodiment of the service provider 6 of the present disclosure. The service provider comprises a server arrangement 35, which may or may not be at least partly hosted by a cloud provider. The server arrangement 35 comprises processing circuitry 31 e.g., a central processing unit (CPU). The processing circuitry 31 may comprise one or a plurality of processing units in the form of microprocessor(s). However, other suitable devices with computing capabilities could be comprised in the processing circuitry 31, e.g., an application specific integrated circuit (ASIC), a field programmable gate array (FPGA) or a complex programmable logic device (CPLD). The processing circuitry 31 is configured to run one or several computer program(s) or software (SVV) 42 (see also FIG. 4) stored in a storage 32 of one or several storage unit(s) e.g., a memory. The storage unit is regarded as a computer readable means 43 (see FIG. 4) as discussed herein and may e.g., be in the form of a Random Access Memory (RAM), a Flash memory or other solid state memory, or a hard disk, or be a combination thereof. The processing circuitry 31 may also be configured to store data in the storage 22, as needed. The storage 32 may e.g., store media files which may be provided to the client 23 as part of the service. The server arrangement 35 also comprises a communication interface 34, e.g., for providing the service to the client 23 and for other external communication.

Figure 4:
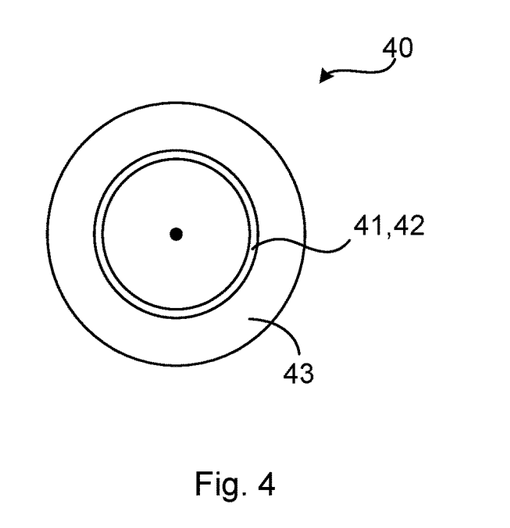
FIG. 4 is a schematic illustration of an embodiment of a computer program product, in accordance with the present invention.

FIG. 4 illustrates an embodiment of a computer program product 40. The computer program product 40 comprises a computer readable (e.g., non-volatile and/or non-transitory) medium 43 comprising software/computer program 41 and/or 42 in the form of computer-executable components. The computer program 41/42 may be configured to cause a radio device 1 or a server arrangement 35, e.g., as discussed herein, to perform an embodiment of a method of the present disclosure. The computer program may be run on the processing circuitry 21/31 of the radio device 1 or server arrangement 35 for causing it to perform the method. The computer program product 40 may e.g., be comprised in a storage unit or memory 22/32 comprised in the radio device 1 or server arrangement 35 and associated with the processing circuitry 21/31. Alternatively, the computer program product 40 may be, or be part of, a separate, e.g., mobile, storage means/medium, such as a computer readable disc, e.g., CD or DVD or hard disc/drive, or a solid state storage medium, e.g., a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 5:
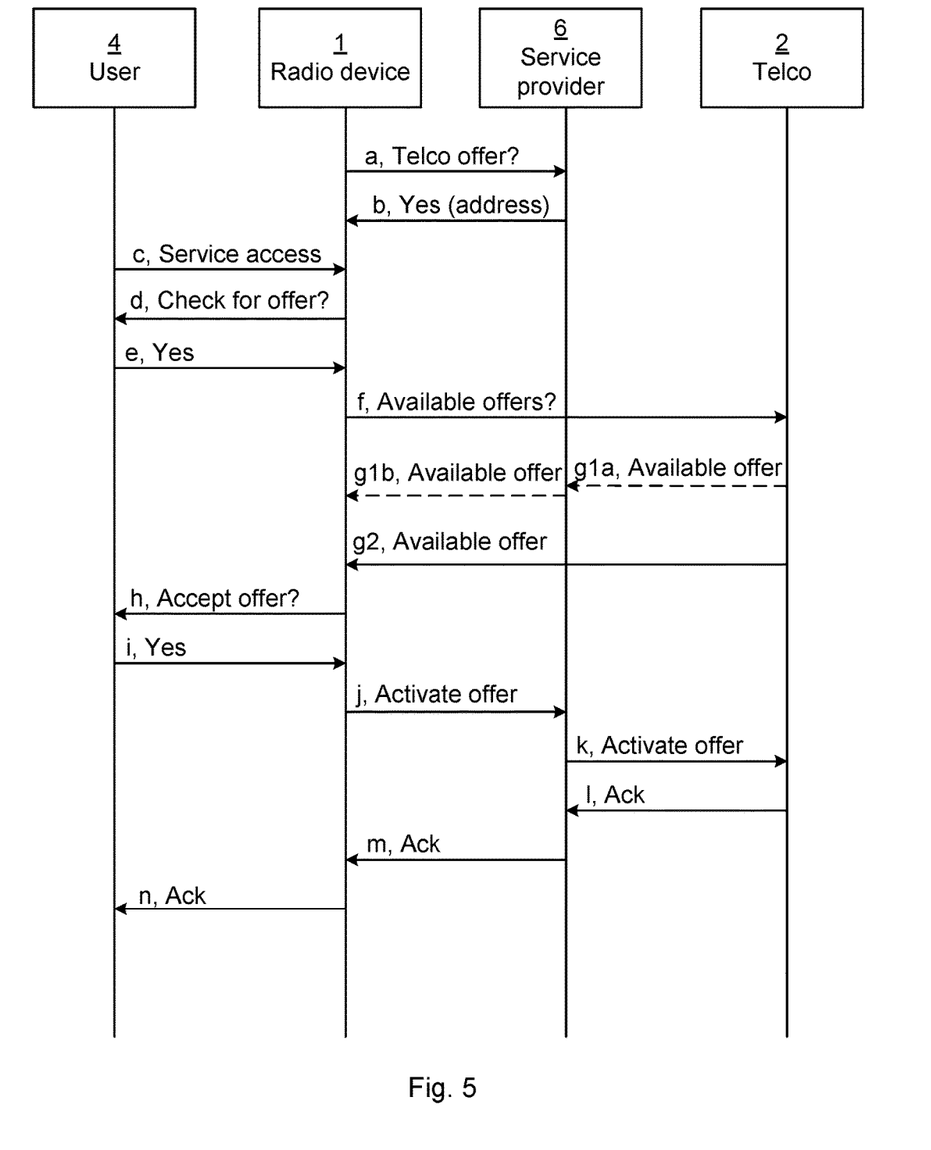
FIG. 5 is a schematic signalling diagram of different embodiments of the methods of the present invention.

FIG. 5 illustrates interactions between the user 4, the radio device 1 (e.g., the client 23 in the radio device), the service provider 6 (e.g., the server arrangement 35 of said service provider), and the telco 2 (e.g., a server arrangement of said telco), in different embodiments of the methods of the present disclosure. Interactions with the user are via a user interface 24 of the radio device.

The radio device determines which telco provides its connectivity. The client 23 may e.g., obtain this information from a part of the radio device handling the subscription with the telco 2. The service provider may have agreements with one or several different telco's regarding providing different service subscription offers to users with network subscriptions with the telco's. The radio device sends a request a requesting information about whether the specific telco providing connectivity to the radio device provides any offer for a subscription to the service. The offer may e.g., be a free subscription to the service, or an upgrade of and existing subscription the user has for the service.

In response, the service provider 6 sends a message b comprising an indication that the telco 2 provides such an offer and an address for contacting the telco regarding said offer. It is not at this stage necessary that the message indicates what type of offer is available, only that there is an offer available. The address allows contact with the telco regarding the offer, e.g., to determine what offer is available.

When the user 4 accesses c or tries to access (use) the service, e.g., tries to access a feature of the service which currently not available to the user, possibly due to that feature requiring an upgrade of the user's subscription to the service, the client 23 can, via the UI 24, inform d the user that there may be an offer available (e.g., an offer which may allow access to the feature not currently available) and ask the user whether he/she would like to check if such an offer is available.

In response to a positive indication e, that the user wants to check for an offer, the radio device 1 sends a message f to the address of the telco previously provided by the service provider. The message is sent via the RAN 3 of the telco 2 and may thus be in flight provided with the phone number or other telco user ID. By means of the message f, the telco is asked whether the user, as identified by the telco user ID, is eligible for a service subscription offer from the telco.

The radio device 1 (typically the client 23) is then informed of the one or more available offer by means of a confirmation message. In some embodiments, this confirmation message g2 is sent from the telco 2. In other embodiments (discussed below) the information is sent via the service provider 6.

The available offer is presented h to the user 4 via the UI 24 and the user can indicate i that the offer is accepted. The radio device then sends a message j to the service provider 6, indicating that the available offer has been accepted and should be activated. The service provider may then in its turn send information k about that the offer is being activated to the telco 2 (e.g., by means of the same address as previously provided to the client 23, or some other address to the telco server arrangement). In response, and acknowledgement (Ack) l may be sent from the telco to the service provider. The service provider may in its turn send an acknowledgement m to the radio device 1 (client 23), and the radio device may present an acknowledgement n to the user via the UI 24.

In some embodiments, the message f may also comprise a service user ID, preferably a temporary service user ID, or the telco may otherwise have been informed of such a service user ID associated with the user 4. In this case, an information message g1a comprising information about the offer and as well as the service user ID may be sent to the service provider 6 (since the service provider can then identify the user by means of the (preferably temporary) service user ID. The confirmation message g1b may then be sent from the service provider. An advantage of these embodiments is that further communication between the service provider 6 and the telco 2 (e.g., the information k about that the offer is being activated and corresponding acknowledgement l) may not be needed.

Figure 6:
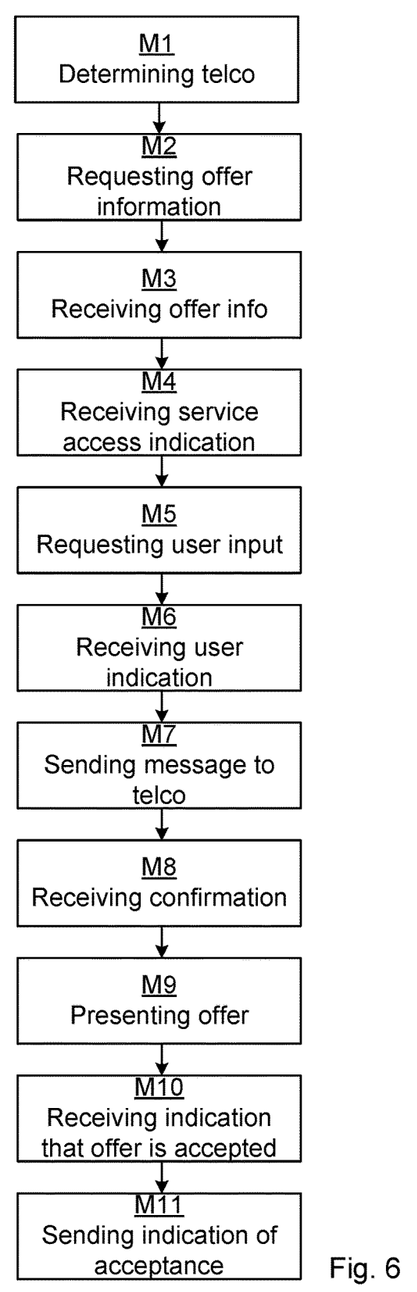
FIG. 6 is a schematic flow chart of an embodiment of the method in a radio device, in accordance with the present invention.

FIG. 6 is a flow chart of an embodiment of the method performed in the radio device 1, of the present disclosure. Which telco 2 the radio device is connected via is first determined M1. Then, the sending M2, to the service provider 6 providing the service, of a request a requesting information about whether the telco provides any offer for a subscription to the service is initiated e.g., by the client 23 in the radio device 1 (the request a being sent by the radio device). In response to the sent M2 request a message (b) comprising an indication that the telco (2) provides such an offer and an address for contacting the telco regarding said offer is received M3 from the service provider 6. An indication c that the user 4 of the radio device requests access to the service via the client 23 is received M4 via a user interface 24 of the radio device. Input from the user 4 about whether said user wants to check whether an offer for a subscription to the service is available is requested M5 via the user interface 24 in response to the received M4 indication that the user requests access to the service. An indication e that the user wants to check whether an offer for a subscription to the service is available is received M6 via the user interface 24 in response to the input having been requested M5. The sending M7 of a message f by means of the received M3 address of the telco 2 via the connection provided by said telco is initiated in response to the received M6 indication that the user wants to check whether an offer is available. A confirmation message g1b or g2 comprising information about an available offer for a subscription to the service is received M8. The available offer is then presented M9 via the user interface. An indication i that the available offer is accepted is received M10 via the user interface. The sending M11 of a message j to the service provider 6 indicating that the available offer has been accepted and should be activated is initiated (e.g., by the client 23).

Figure 7:
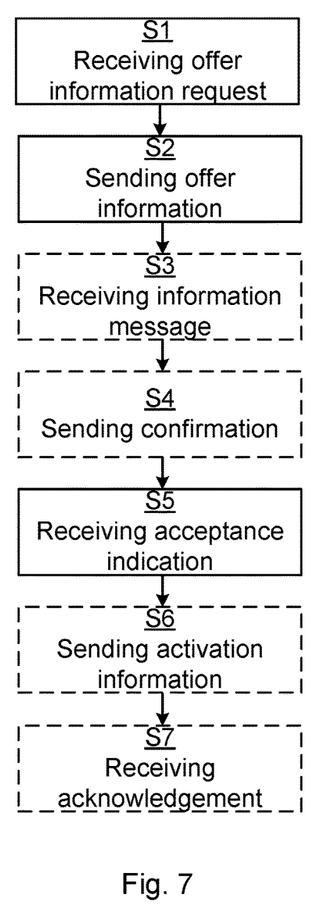
FIG. 7 is a schematic flow chart of an embodiment of the method in a server arrangement, in accordance with the present invention.

FIG. 7 is a flow chart of embodiments of the method performed in the server arrangement 35 of the service provider 6. A request a requesting information about whether a telco provides any offer for a subscription to the service provided by the service provider is received S1 from a radio device 1. A message b comprising an indication that the telco 2 provides such an offer (i.e., an offer for a subscription to the service) and comprising an address for contacting the telco regarding said offer is sent S2 in response to the received S1 request. A message j indicating that the offer has been accepted and should be activated is then received S5 from the radio device 1.

In some embodiments, the method performed in the server arrangement 35 also comprises receiving S3 an information message g1a from the telco 2, the information message g1a comprising information about the offer and an identifier (herein also called service user ID) used by the service provider 6 for identifying a user 4 of the radio device 1. Then, a confirmation message g1b comprising the information about the offer may be sent S4 to the radio device 1. In some embodiments, the ID is a temporary identifier previously sent to the radio device 1, e.g., in the message b comprising the indication that the telco 2 provides the offer.

In some other embodiments, the method performed in the server arrangement 35 also comprises sending S6 information k about that the offer is being activated to the telco 2. Then, an acknowledgement l may be received (S7) from the telco 2 in response to the sent S6 information.

Examples

An App 23 for a streaming media service in a mobile phone 1 detects the Telco 2 identifier from the telco network name (i.e., the name of the operator 2) from within the mobile phone.

The App, being a client to the service provider 6, then M2 sends this Telco identifier to the service provider backend and gets a response b that there is an active premium deal with that Telco. The backend also responds with the check-offer Telco server internet address.

Then the App awaits the user 4 performing some sort of activity that requires a premium subscription for the service, for example offline music, pick the exact next song to play (i.e., not accept a shuffled playlist) or the like. The App will then popup a question d:

"You might be eligible for a premium offer from [Telco name]. Do you want us to check?"

If the user responds yes, the App will send M7 an empty HTTP GET request f to the check-offer Telco server, by means of the address previously received.

Internet HTTP requests sent from a mobile phone to specific Telco servers may be instrumented (in flight) by the Telco 2, to include the phone number of the mobile phone 1. This is possible since it is sent inside the Telco network.

Such an extra header could e.g., be:

X-UP-SUBNO: 070-12345678

The Telco check-offer server will detect the added X-UP-SUBNO and then check if the Telco subscriber is eligible for e.g., a 6-months premium subscription, and return YES or NO, or information specifying the available offer.

If YES, the App sends a message j to the service provider backend that the 6-months premium subscription can be started and informs the user the same.

Alternative Implementation:

The HTTP request f is not empty, but contains an anonymized service provider user ID. The Telco check-offer server will then tell the service provider (step S3) through the Telco-Service provider Application Program Interface (API) that the user is eligible for the offer. The App then requests (step S4) this information from the service provider Backend and tells the user.

According to another aspect of the present disclosure, there is provided a method performed in a radio device 1 comprising a client of a service. The method comprises sending a request a requesting information about whether the telco 2 which the radio device is connected via provides any offer for a subscription to the service. The method also comprises receiving a message b comprising an indication that the telco provides such an offer and an address for contacting the telco regarding said offer. The method also comprises receiving an indication e that a user of the radio device wants to check whether an offer for a subscription to the service is available. The method also comprises sending a message f by means of the received address of the telco. The method also comprises receiving a confirmation message g1b or g2 comprising information about an available offer for a subscription to the service. The method also comprises receiving an indication i that the available offer is accepted by the user. The method also comprises, to the service provider 6, sending a message j indicating that the available offer has been accepted and should be activated. This aspect may be regarded as simplified, with some features which are optional in some embodiments of the present disclosure removed.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed in a radio device comprising a client of a service, the method comprising:
   determining a telecommunications operator (telco), to which the radio device is connected via a connection provided by said telco;
   to a service provider providing the service, initiating sending of a request requesting information about whether the telco, to which the radio device is connected, provides any offer for a subscription to the service;
   from the service provider, in response to the sent request, receiving a message comprising an indication that the telco provides such an offer and an address for contacting the telco regarding said offer;
   via a user interface of the radio device, receiving an indication that a user of the radio device requests access to the service via the client;
   via the user interface, in response to the received indication that the user requests access to the service, requesting input from the user about whether said user wants to check whether an offer for a subscription to the service is available;
   in response to the input having been requested, via the user interface, receiving an indication that the user wants to check whether an offer for a subscription to the service is available;
   in response to the received indication that the user wants to check whether an offer is available, initiating sending a message by means of the received address of the telco, via the connection provided by said telco, wherein the initiating sending a message by means of the received address comprises initiating sending the message comprising an identifier (ID) of the user used by the service provider;
   receiving a confirmation message comprising information about an available offer for a subscription to the service, wherein the receiving a confirmation message comprises receiving the confirmation message from the telco;
   via the user interface, presenting the available offer;
   via the user interface, receiving an indication that the available offer is accepted; and
   to the service provider, initiating sending a message indicating that the available offer has been accepted and should be activated.

2. The method of claim 1, wherein the ID is a temporary identifier previously received from the service provider.

3. The method of claim 1, wherein the receiving a confirmation message, comprises receiving the confirmation message from the service provider.

4. The method of claim 1, wherein the available offer is an offer for upgrading, to a premium subscription, a pre-existing user subscription to the service.

5. The method of claim 1, wherein the method is performed by the client.

6. A non-transitory computer program product comprising computer-executable components for causing a radio device to perform a method, when the computer-executable components are run on processing circuitry comprised in the radio device, comprising:
   determining a telecommunications operator (telco), to which the radio device is connected via a connection provided by said telco;
   to a service provider providing the service, initiating sending of a request requesting information about whether the telco, to which the radio device is connected, provides any offer for a subscription to the service;
   from the service provider, in response to the sent request, receiving a message comprising an indication that the telco provides such an offer and an address for contacting the telco regarding said offer;
   via a user interface of the radio device, receiving an indication that a user of the radio device requests access to the service via the client;
   via the user interface, in response to the received indication that the user requests access to the service, requesting input from the user about whether said user wants to check whether an offer for a subscription to the service is available;
   in response to the input having been requested, via the user interface, receiving an indication that the user wants to check whether an offer for a subscription to the service is available;
   in response to the received indication that the user wants to check whether an offer is available, initiating sending a message by means of the received address of the telco, via the connection provided by said telco, wherein the initiating sending a message by means of the received address comprises initiating sending the message comprising an identifier (ID) of the user used by the service provider;
   receiving a confirmation message comprising information about an available offer for a subscription to the service, wherein the receiving a confirmation message comprises receiving the confirmation message from the telco;
   via the user interface, presenting the available offer;
   via the user interface, receiving an indication that the available offer is accepted; and
   to the service provider, initiating sending a message indicating that the available offer has been accepted and should be activated.

7. A radio device comprising:
   processing circuitry; and storage storing instructions executable by said processing circuitry whereby said radio device is operative to:

determine a telecommunications operator (telco), to which the radio device is connected via a connection provided by said telco;

to a service provider providing the service, initiate sending of a request requesting information about whether the telco, to which the radio device is connected, provides any offer for a subscription to the service;

from the service provider, in response to the sent request, receive a message comprising an indication that the telco provides such an offer and an address for contacting the telco regarding said offer;

via a user interface of the radio device, receive an indication that a user of the radio device requests access to the service via the client;

via the user interface, in response to the received indication that the user requests access to the service, request input from the user about whether said user wants to check whether an offer for a subscription to the service is available;

in response to the input having been requested, via the user interface, receive an indication that the user wants to check whether an offer for a subscription to the service is available;

in response to the received indication that the user wants to check whether an offer is available, initiate sending a message by means of the received address of the telco, via the connection provided by said telco, wherein initiating sending a message by means of the received address comprises initiating sending the message comprising an identifier (ID) of the user used by the service provider;

receive a confirmation message comprising information about an available offer for a subscription to the service, wherein receiving a confirmation message comprises receiving the confirmation message from the telco;

via the user interface, present the available offer;

via the user interface, receive an indication that the available offer is accepted; and to the service provider, initiate sending a message indicating that the available offer has been accepted and should be activated.

\* \* \* \* \*